Jan. 6, 1948. J. A. MAGNESI 2,434,046
EGG SEPARATOR
Filed Dec. 26, 1945

Inventor
Joseph A. Magnesi

Attorneys

Patented Jan. 6, 1948

2,434,046

UNITED STATES PATENT OFFICE 2,434,046

EGG SEPARATOR

Joseph A. Magnesi, Pittsburg, Calif.

Application December 26, 1945, Serial No. 637,208

1 Claim. (Cl. 146—2)

My invention relates to improvements in egg separators, and particularly to that class of separators provided with a cup and a surrounding cutting ring for removing the white or albumin portion of the egg from the yolk.

It is an object of the invention to provide an egg separator of the character mentioned which shall be capable of separating albumin from yolks in fresh or cold-storage eggs.

It is a further object of the invention to provide a separator in the form of a cup having lateral supports for supporting said cup on a glass or bowl, and having a cutting ring closely fitting the sides of the cup and detachable therefrom by means of suitable handles.

It is a still further object of the invention to provide a separator which shall be easy and cheap to fabricate, and which shall be readily washed, cleaned or sterilized.

With these and other objects in view, the invention consists in the construction and novel combination of parts hereinafter fully described, illustrated in the accompanying drawings and pointed out in the claim; it being understood that various changes in the form, proportion, size and minor details of construction, within the scope of the claim appended, may be resorted to without departing from the spirit of the invention or sacrificing any advantages thereof.

In the drawings, wherein similar reference numerals indicate corresponding parts throughout the several views, Figure 1 is a plan view of the device embodying the invention;

Figure 1:
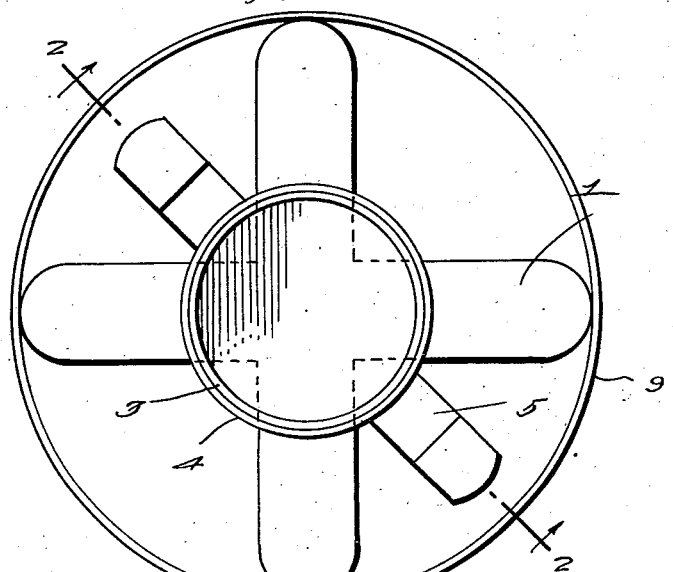
Figure 2:
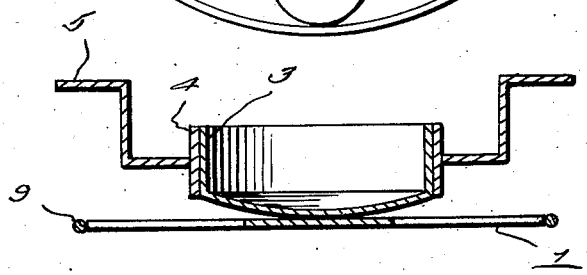
Figure 2 is a vertical sectional view taken on the line 2—2 of Figure 1.
Figure 3:
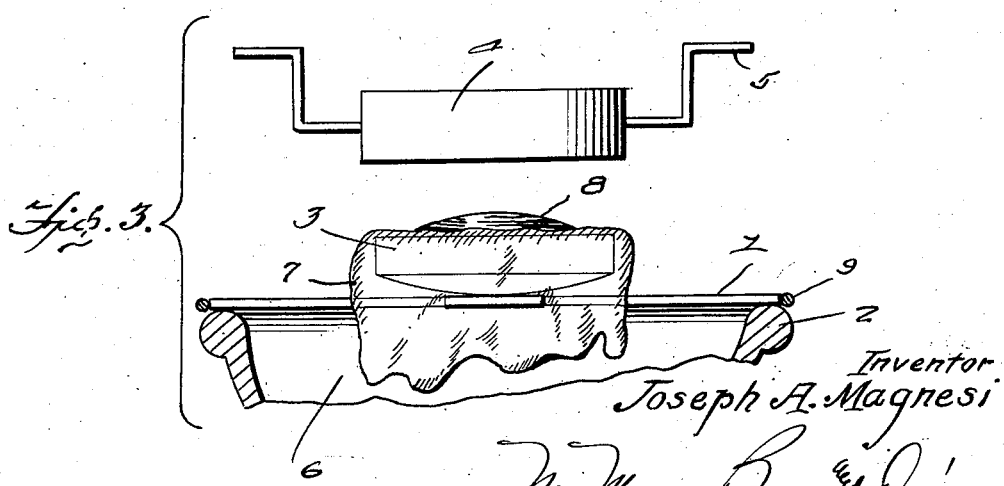
Figure 3 is an elevational view of the cup and cutting ring, associated with the invention; and shows the manner of mounting the device on a bowl.

Referring to the drawings, I represents a support or base for the device, having four laterally extending members, adapted to rest on the lips 2 of a bowl or other receptacle 6.

Secured to the support or base I is a small cup 3, perhaps 1½" in diameter and ½" in height, into which the contents of an egg may be poured when it is desired to separate the albumin from the yolk of said egg. The cup 3 may be of circular cross section horizontally, and have a slightly convex bottom, although the specific shape and size of the cup may obviously be varied without altering the principle and spirit of the invention.

The outer ring 4 is of annular construction, and adapted to fit tightly, although slidably, on the annular outer surface of the cup 3. Secured to the outer ring 4 in any convenient fashion are two handles 5, secured at diametrically opposite points of the ring 4 and extending diametrically from their points of attachment before bending vertically upward to a level above the rim of the cup, and then diametrically outward from the cup for a further short distance.

In operation the outer ring 4 is placed about the cup 3, and the cup supported on base I over a bowl or other container 2 into which it is desired to cause the albumin to flow, as illustrated in Figure 4 of the drawings. The egg is then cracked into the cup 3. To separate the albumin 7 from the yolk 8, the outer ring is lifted from the cup by means of the handles 5, to clear the cup by perhaps ½" thereby removing a portion of the albumin and then returned to its former position on the cup further cutting the albumin. Further, when the outer ring 4 is lifted from the cup 3 it may be pulled to one side to cause the white to be detached from the cup 3.

The yolk of an egg being heavier than the albumin settles in the cup 3, and said cup being approximately of the correct size to contain the said yolk, it becomes readily possible to effectuate complete and efficient separation with the device.

A circularly disposed wire support 9 joins the ends of the four laterally extending members comprising the support I.

What I claim is:

In an egg-separating device, the combination, which comprises an egg yoke-receiving cup having a vertically disposed band with a dished convex base forming a closure for the lower end, radially disposed arms extending outward from the center of the lower surface of the convex base of the cup and permanently secured thereto, a ring concentric with the cup connecting the outer ends of the radially disposed arms, a superimposed cutting band freely slidable over the band of the cup, and bars extending outward from oppositely disposed points intermediate the height of the superimposed band, then upward to a point spaced from the upper edge of the band, and then outward providing handles for said superimposed band.

JOSEPH A. MAGNESI.

REFERENCES CITED

The following references are of record in the file of this patent:

UNITED STATES PATENTS

| Number | Name | Date |
|---|---|---|
| 1,214,720 | Sobeck | Feb. 6, 1917 |
| 1,407,371 | Braddock | Feb. 21, 1922 |
| 2,382,737 | Mink | Aug. 14, 1945 |